Nov. 1, 1966   J. R. SUTTON   3,282,565
OFFSHORE EQUIPMENT SUPPORTS
Original Filed April 22, 1960   9 Sheets-Sheet 1

INVENTOR
JOHN R. SUTTON

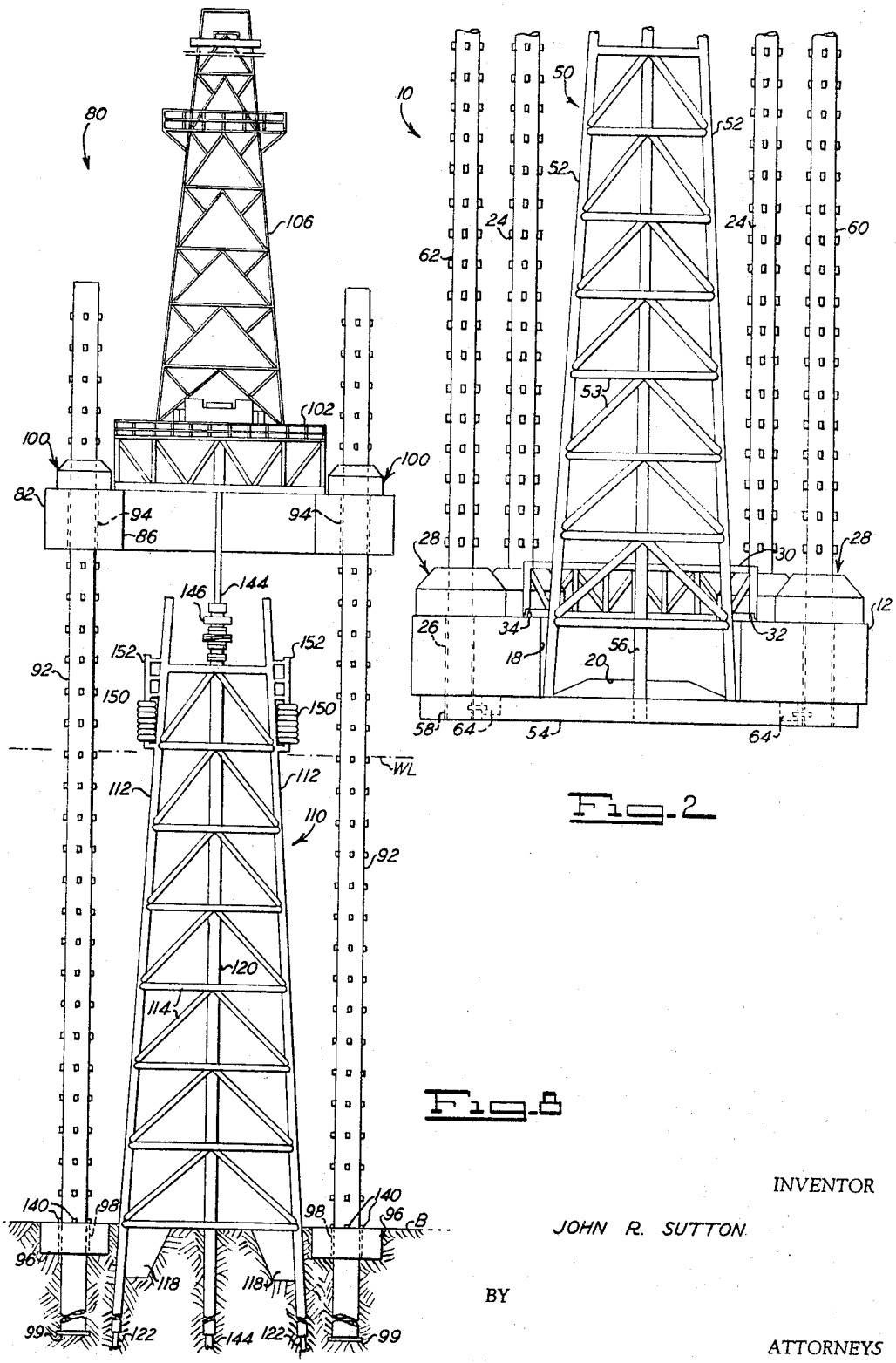

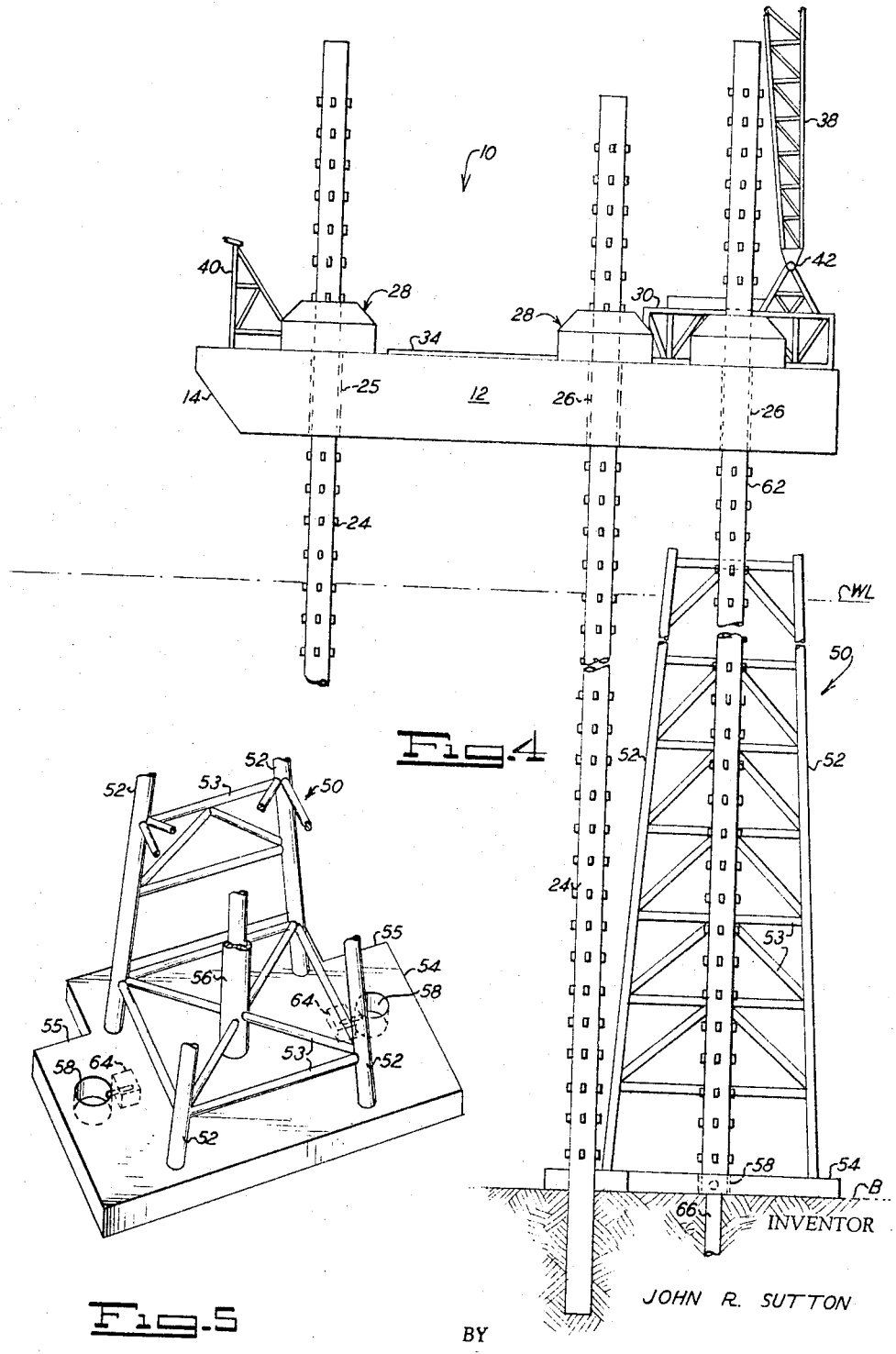

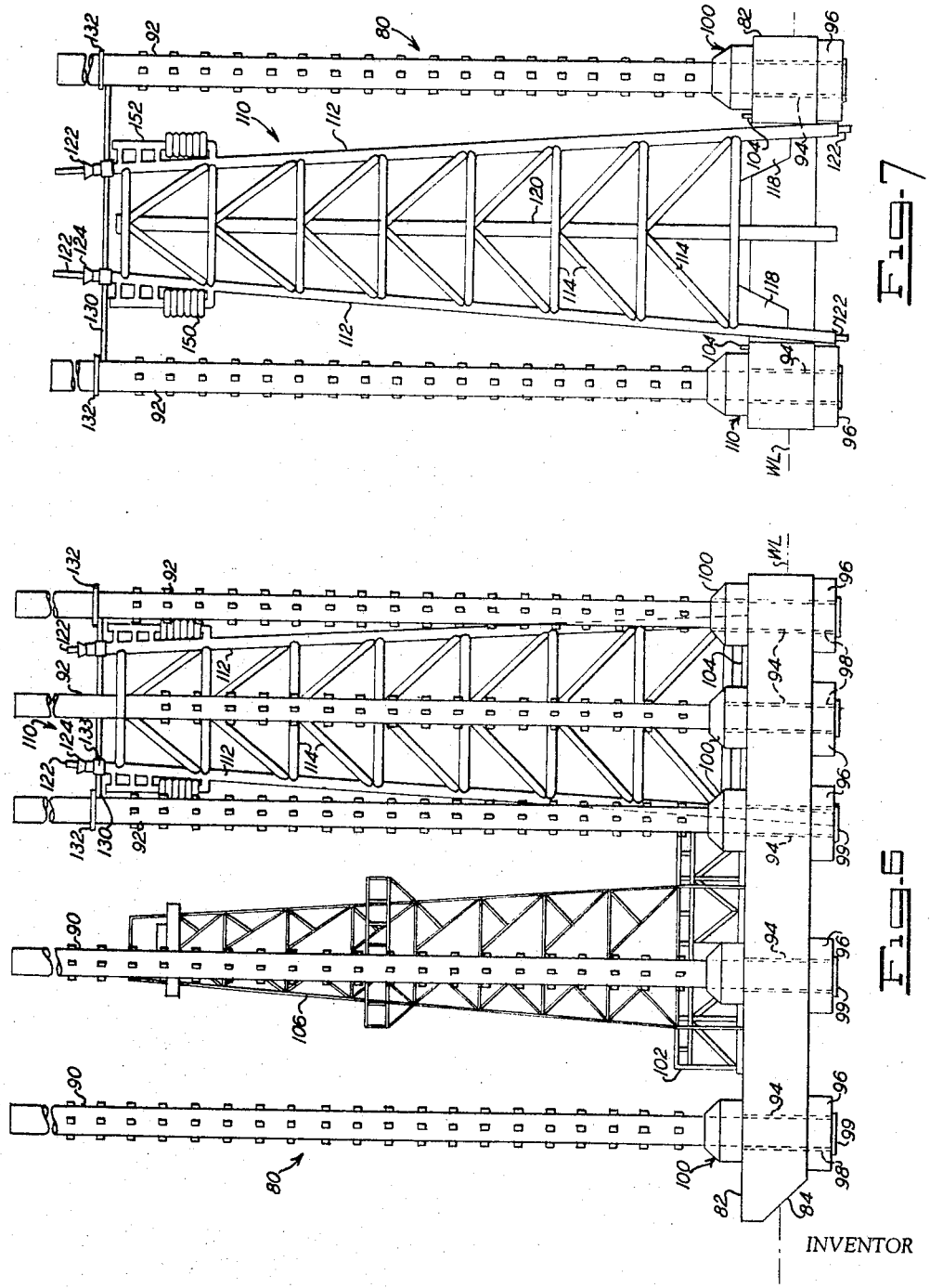

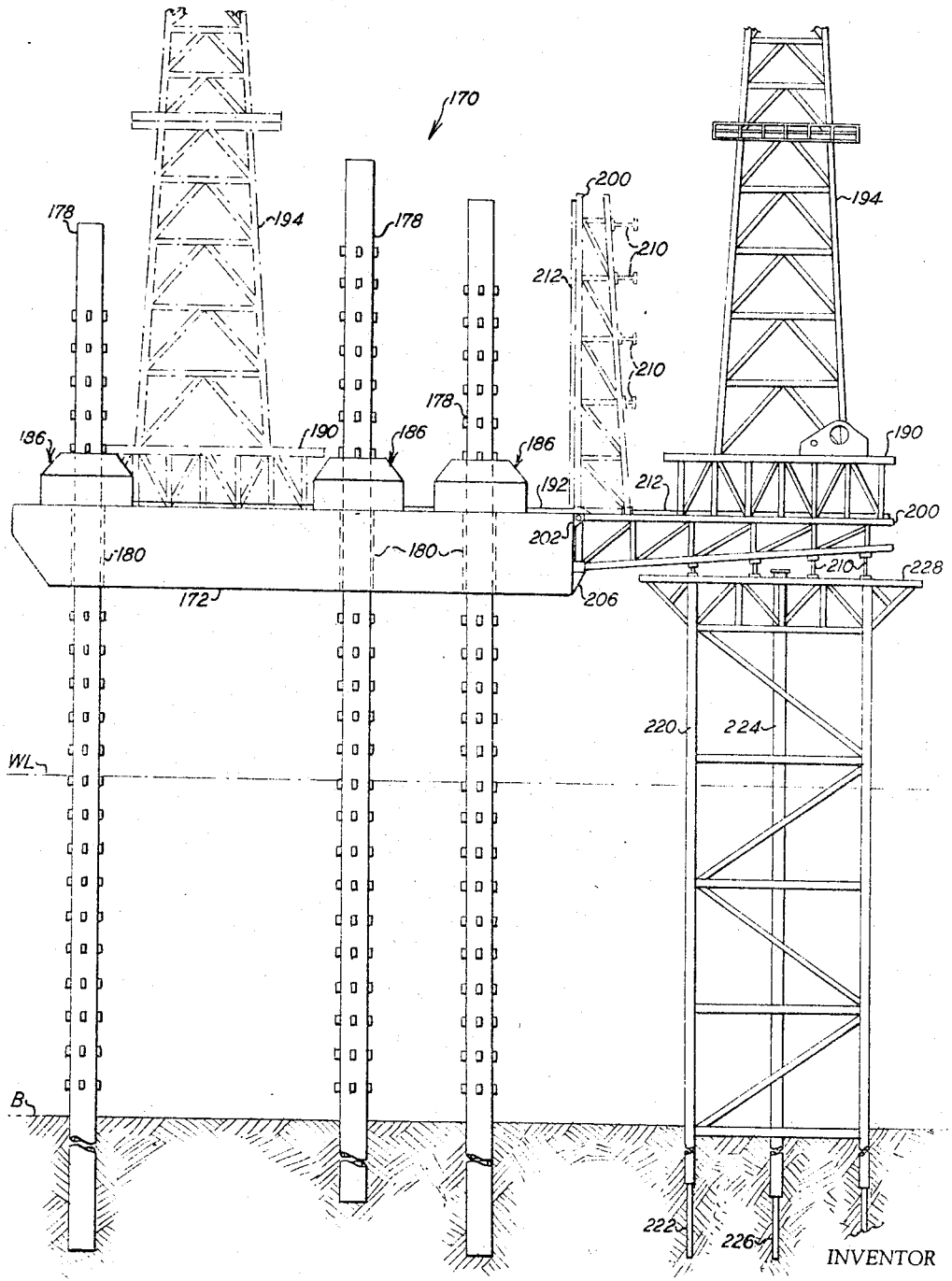

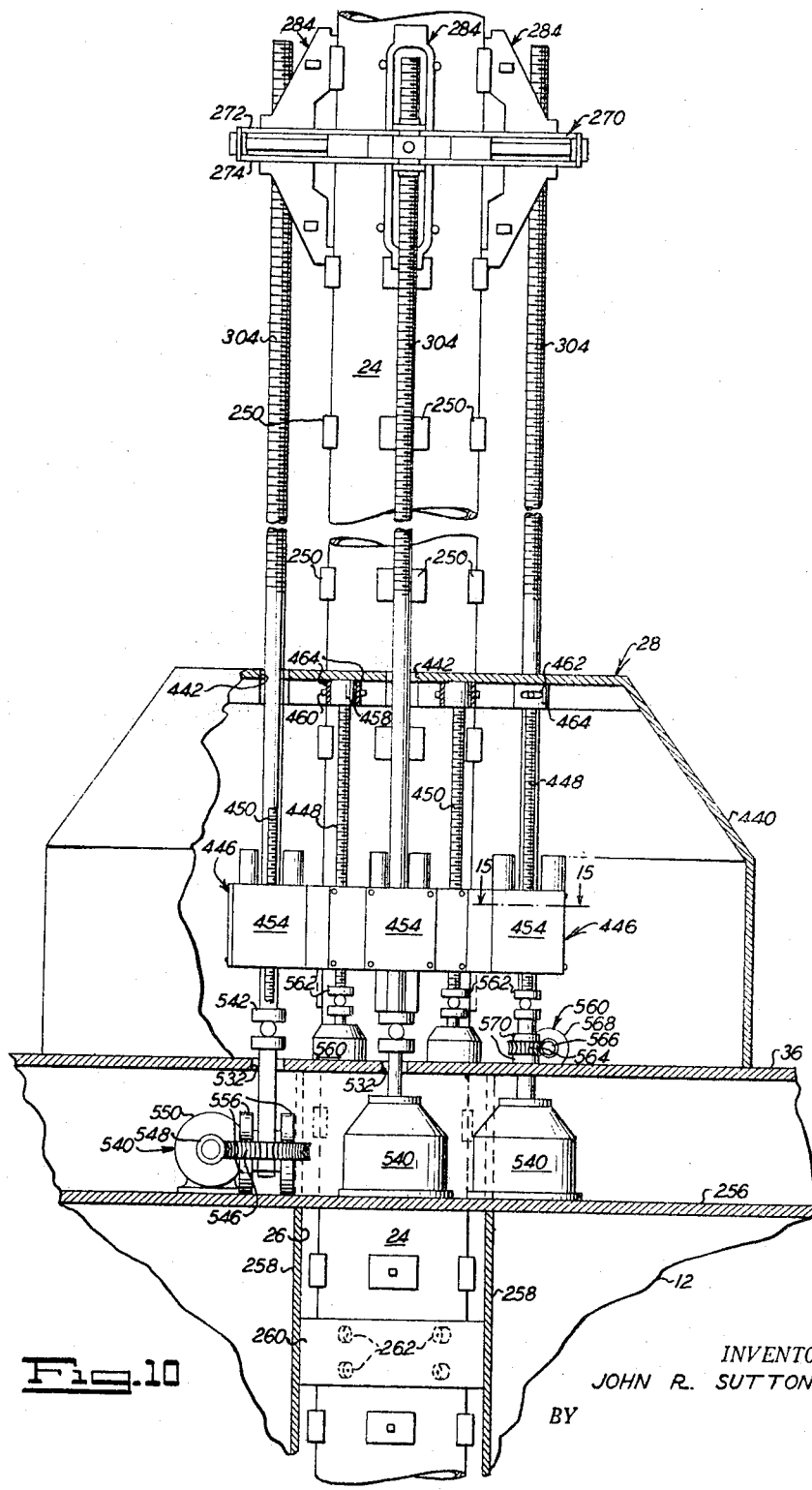

Nov. 1, 1966

J. R. SUTTON 3,282,565

OFFSHORE EQUIPMENT SUPPORTS

Original Filed April 22, 1960

INVENTOR
JOHN R. SUTTON
BY
ATTORNEYS

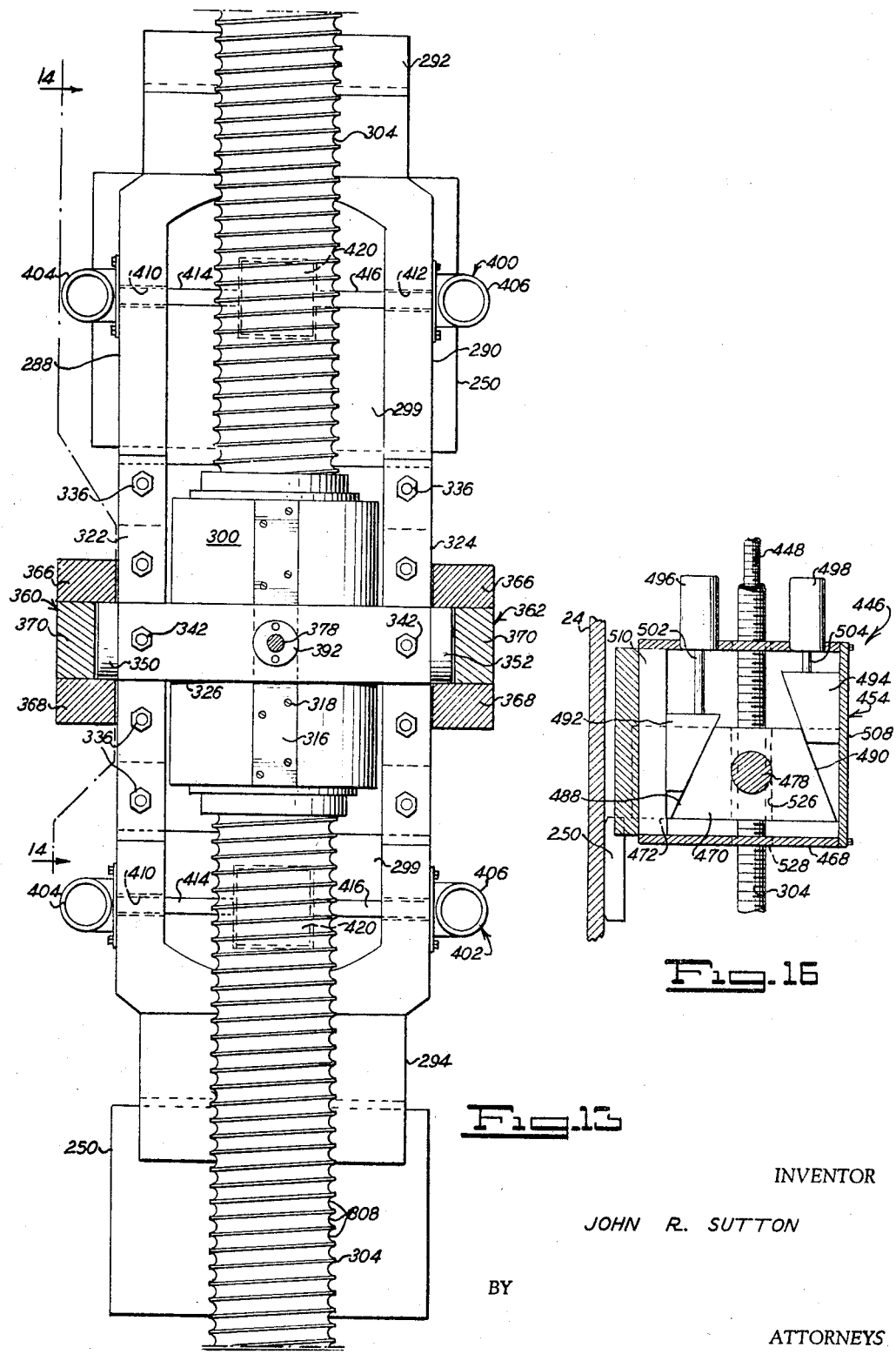

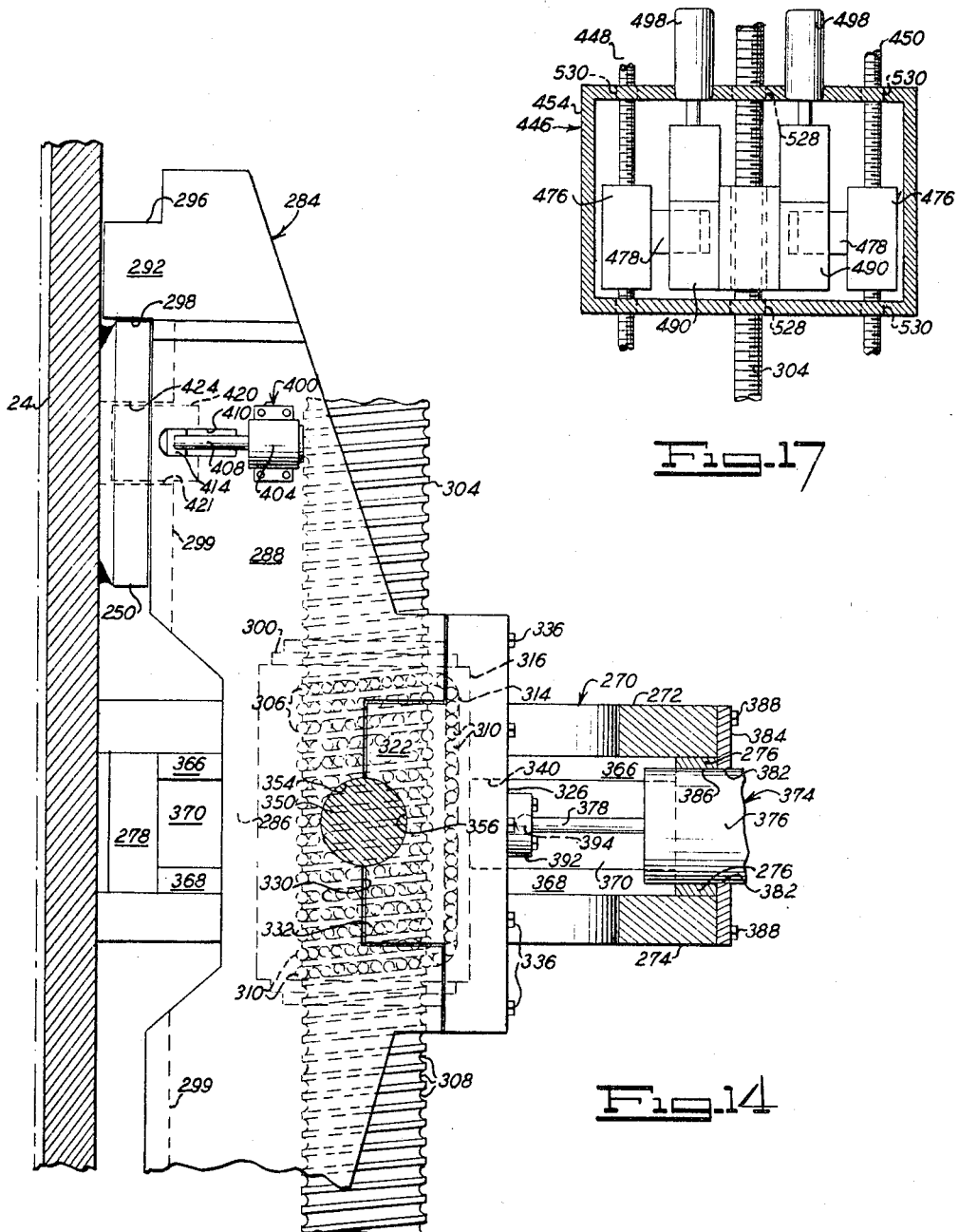

United States Patent Office 3,282,565
Patented Nov. 1, 1966

3,282,565
OFFSHORE EQUIPMENT SUPPORTS
John R. Sutton, P.O. Box 32, Beaumont, Tex.
Original application Apr. 22, 1960, Ser. No. 24,120, now Patent No. 3,201,945, dated Aug. 24, 1965. Divided and this application Nov. 10, 1964, Ser. No. 438,440
5 Claims. (Cl. 254—92)

This is a division of application Serial No. 24,120, filed April 22, 1960, and now Patent No. 3,201,945 which in turn is a continuation-in-part of my copending application Serial No. 681,057, filed August 29, 1957, and now Patent No. 3,082,607.

This invention relates to offshore equipment supports. Although particular reference will be made to the use of such supports in oil recovering operations, other uses, such as for offshore radar stations, for example, will be apparent.

In recent years much attention has been devoted to the recovery of oil, gas, and other natural resources from lands located beneath bodies of water. In general, the procedure followed has included the erection of a stable equipment support structure or island at the sight of the proposed well. Such supports commonly are formed by erecting permanent platforms upon piling which has been driven into the floor of the body of water. Also, such supports sometimes are formed of one or more barges which may be floated to the desired location and then fixed against movement relative to the bottom of the body of water. The suppport structures carry all or a part of the machinery and other equipment required for the oil recovery operations to be performed, and they provide living quarters for operating personnel. Tender boats having additional machinery may be used in cooperation with the support structures.

When such supports are to be employed in bodies of water where large waves may be anticipated from time to time, it is essential that they present relatively little resistance to wave action at the surface of the water. This result may be accomplished by constructing a support so that the actual equipment platform is disposed a substantial distance above the surface of the water and is supported upon towers or columns which offer little resistance to wave action. This principle has been used extensively, and several approaches have been taken to the problem of disposing the equipment platform at the required elevation above the surface of the water.

One objectionable feature of previous types of equipment platforms is that they are not easily moved from place to place and not suitable for exploratory oil well drilling operations. Once a conventional type equipment platform has been erected at an offshore drilling site, it is not easily moved to a new location.

Another objectionable feature arises in connection with permanent-type equipment platforms. If a producing oil well is not established by the drilling operation, it is expensive and difficult to dismantle the permanent structure and move it to a new drilling site. On the other hand, if a floatable platform is used for the drilling equipment, it is necessary to erect a second structure if a producing well is established. This must be done so that the floatable platform may be moved to a new drilling site.

It is an object of this invention to provide offshore equipment supports which will function efficiently under the severe service conditions imposed upon them and which may be erected with ease and safety.

It is another object of this invention to provide offshore equipment supports which are particularly adaptable for exploratory oil well drilling operations.

It is another object of this invention to provide offshore equipment supports which may be moved conveniently to different offshore locations.

A more specific object of this invention is to provide a simple, durable power-actuated system for raising and lowering certain of the structure associated with equipment supports, and for raising and lowering the equipment support platform itself.

This invention contemplates the use of a floatable, barge-like, equipment platform which can be towed to an offshore drilling location. The equipment platform is provided with several vertically extending columns or caisson members which may be moved in either vertical direction relative to the platform. During the towing of the equipment platform, the columns are in a riased position wherein they extend above the deck of the platform. Relative movement between each column and the platform is accomplished by means of a novel jack system which serves two major functions, the first being to raise the columns above the platform and to lower each column to the floor of the body of water on which the platform is floating after the platform has reached the desired offshore location, and the second being to raise the equipment platform on the columns above the surface of the water whereby the platform is supported by the columns above the action of the waves and to lower the platform back to the surface of the water.

One embodiment of this invention employs a well-support stand comprising a built up, tower-like structure which rests on a large-area mat unit. The stand is carried by the equipment platform within a slotted portion thereof to the offshore drilling location. Lock mechanisms connect the mat unit of the stand to the bottom portion of certain of the upstanding column members. The jack system can be operated to lower the mat supporting columns so that the well-support stand will be lowered to the floor of the body of water. Also, the jack system can be operated to lower the remaining column members to the floor of the body of water and then to raise the equipment platform, on all of the column members, above the surface of the water.

The equipment platform is provided with a mast or spar structure which is mounted on a bed that travels on rails from a position near the center of the platform to a position over the slotted portion in the platform. The mast can be raised or lowered by means of a hoisting device.

During the towing operation, the bed is located near the center of the platform and the mast is in a lowered position. A well-support stand is carried by the platform in the slotted portion and the several column members are raised above the deck of the platform and held in this position by the jack system.

After the desired offshore location has been reached, the stand and the several column members are lowered to the floor of the body of water by the jack system whereupon the mat unit of the stand and the bottom portions of the column members become firmly embedded on the floor. The operation of the jack system is continued in order to raise the equipment platform on the several column members so that the platform is lifted above the surface of the water. After the platform has been elevated to the desired height, the traveling bed unit is then moved over the slotted portion of the platform which has been vacated by the stand. In this position, the bed unit is directly over the stand which is submerged in the water except for its upper end portion which extends above the surface of the water. The mast is then raiesd by the hoisting device so that it is in position to lift drill rods and casing parts and other equipment as necessary in order to carry out the drilling operation.

In the event that a well is established, the lock mechanism which connects the lower portion of the mat support columns to the mat unit of the stand can be released so that the stand can be separated from the equipment platform. This allows the stand to be left in place while the equipment platform is moved to a new location. The stand may be equipped with the necessary apparatus to serve as an oil well production stand.

It will be readily apparent to those skilled in the art that this procedure eliminates the need for erecting, first a drilling platform which must be removed after the drilling operation is completed if production is established, and erecting a separate production platform in the event that a producing oil well is established as when drilled by a conventional mobile drilling barge. If the drilling operation does not result in a producing oil well, the stand can be elevated by the jack system into the slotted portion of the equipment platform and then moved to a new offshore drilling location. If a producing well is established, the stand can be left in place and the platform can be towed to port where it can be equipped with a new stand, or a new stand can be towed out to the equipment platform.

In another embodiment, a floatable, barge-like, equipment platform is provided with vertically extending column members and a jack system. This structure is identical to a great extent with the corresponding structure previously described. A tower-like well support stand is carried by the equipment platform in the slotted portion thereof. The stand is connected to the equipment platform by means of bracing members which extend between the top portions of the stand and the top portions of certain of the column members. The raising and lowering of the stand is achieved by raising and lowering the column members to which the stand is attached. The platform is provided with a bed which travels on rails and is movable from a position near the center of the barge to a position over the slotted portion of the barge. A derrick structure is mounted on and movable with the traveling bed and provides means by which drilling rods and casing portions can be raised as required for the drilling operation.

The equipment platform and the well-support stand can be towed to an offshore location as a unit. By operating the jack system after the drilling site has been reached, the column members and the stand can be lowered to the floor of the body of water and the equipment platform can be elevated on the column members above the surface of the water. The traveling bed and derrick may be moved over the slotted portion of the equipment platform so that they are directly above the stand. Thereafter the drilling operation may be performed. In the event that a producing well is established, the bracing members which connect the top portions of the stand to the top portions of certain of the column members may be removed so that the stand may be left in place to serve as an oil well production stand and the equipment platform can be removed to another offshore location.

Also, this embodiment discloses the use of a series of buoyancy units used in connection with the column members for providing additional buoyancy to the equipment platform, and for providing additional bearing area for the column members when they are lowered to the floor of the body of water.

In still another embodiment, a similar type of floatable barge-like equipment platform provided with column members, a jack system and traveling bed and derrick structure are employed. The equipment platform is equipped with a vertically swingable extension unit which allows the equipment platform to be used in connection with existing production platforms. The extension unit is provided with rails so that the traveling bed and derrick can be moved over the extension unit. In use of this structure, the equipment platform is towed to an offshore location adjacent to an existing production platform. The column members are lowered to the floor of the body of water by the jack system and then the platform is elevated on the columns. The extension unit, which is normally raised during the towing operation, is then lowered so that it extends over the existing production platform. The traveling bed and derrick are then moved along the rails onto the extension unit so that the derrick extends directly above the production platform. The hoisting mechanism of the derrick may then be used to carry out whatever operations are desirable.

The jack system used in connection with the equipment platform of this invention includes separate jack devices for each of the column members. Each column member has a series of lugs attached thereto for cooperating with the jack device. Each jack device includes a yoke member surrounding the column and carrying a group of lift-head units which contact the lugs on the column. Included in each lift-head unit is a ball bearing nut which cooperates with a vertically extending, threaded lift-shaft. A power mechanism is provided for rotating each of the lift-shafts so that relative movement may be achieved between the lift-head units and the lift-shafts. In operating a jack device, for example when the equipment platform is to be elevated on columns, the lift-head units rest upon a group of lugs on the column, and then the power mechanism is actuated to rotate the lift-shafts, and because the shafts are connected with the equipment platform, the entire platform is raised upwardly with respect to the column.

The lift units of each jack device operate in stroke fashion. During a lifting stroke, the lift-shafts are screwed through the lift-head units so that at the beginning of the stroke, the lift-head units are at the upper end portion of the lift-shafts and at the end of the stroke, the lift-head units end up near the bottom portion of the lift-shafts. This requires a non-lifting or return wherein the rotation of the lift-shafts is reversed so that the lift-head units can be threaded along the lift-shafts to the upper end portions thereof so that another lift stroke can be started.

During a non-lifting stroke, a series of lock-head units are brought into engagement with the lugs on the column to support the weight of the equipment platform so that the lift units can be backed away from the lugs in order to achieve the necessary adjustment thereof. The lock-head units are associated with lock-head shafts which are rotated by a power mechanism so that the lock-heads can be adjusted to engage the lugs on the column. A short lift may be performed by the lock-head units during the time that the lift-head units are disengaged from the column lugs.

The columns extend through openings or holes in the equipment platform and provision is made for guiding the columns through the holes. The connection between each column member and the equipment platform is provided by a jack device, each one of which may be operated independently of the other.

Other features and advantages of the present invention will become apparent from the following detailed description of certain embodiments thereof illustrated in the accompanying drawings in which:

FIG. 3 is a plan view corresponding to FIG. 1 in which certain parts have been omitted;

FIG. 4 is a side elevational view showing the equipment support and the members illustrated in FIG. 1 in position during a drilling operation;

FIG. 5 is a fragmentary perspective view of a well-support stand;

FIG. 6 is a side elevational view of a modified offshore equipment support, the various members of which are shown in position to be towed;

FIG. 7 is an end elevational view of the modified structure shown in FIG. 6;

FIG. 8 is an end elevational view of the modified structure shown in FIG. 6 in position during a drilling operation;

FIG. 9 is a side elevational view of another modified structure shown in position for use with an existing oil well production platform;

FIG. 10 is an enlarged fragmentary elevational view of a jack device and column member;

FIG. 13 is a sectional elevational view taken along line 13—13 of FIG. 11;

FIG. 14 is a sectional elevational view taken along line 14—14 of FIG. 13;

FIG. 16 is a sectional view taken along line 16—16 of FIG. 15; and

FIG. 17 is a sectional elevational view taken along line 17—17 of FIG. 15.

In some of these views, the water line WL and the floor or bottom B of a body of water have been indicated in order to make the relationships described below easier to understand.

Figure 1:
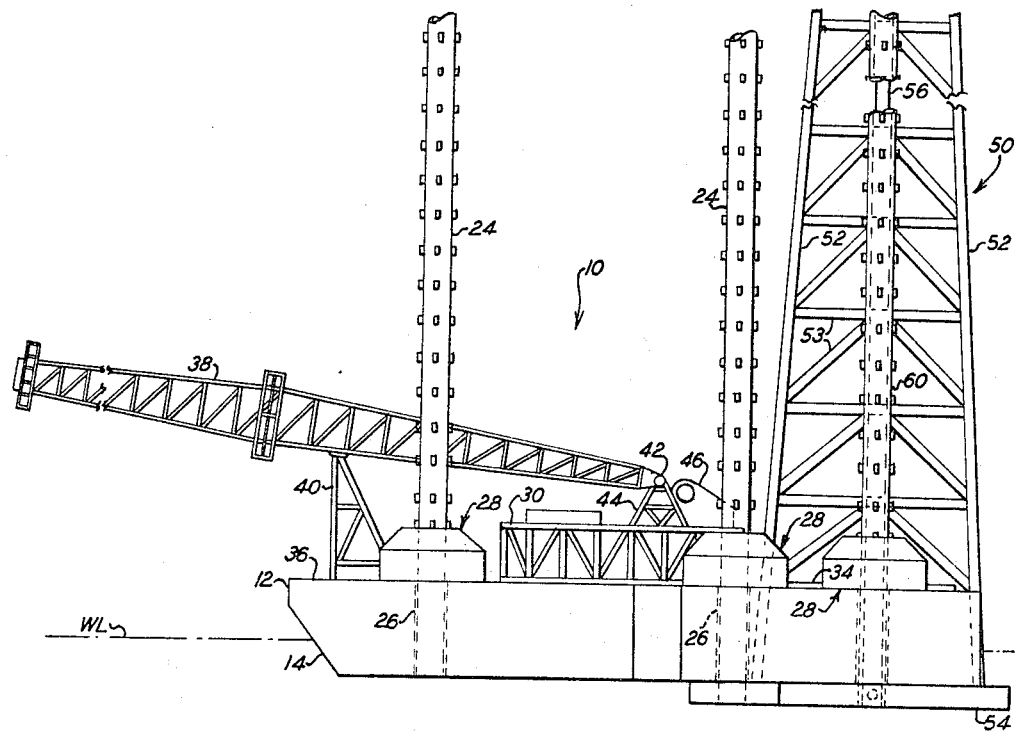
FIG. 1 is a side elevational view of an offshore equipment support for oil well drilling equipment, the various members of which are shown in position to be towed to an offshore location.

In the drawings, with particular reference to FIG. 1, a barge-like support assembly 10 is in position to be towed over a body of water by any suitable means such as tug boats. The support assembly 10 may be towed to a desired offshore location where it may be erected into a structure to be used for drilling an oil well. While particular use in oil well drilling is described, it will become apparent to those skilled in the art that other uses, such as for offshore radar stations, may be made of the structures to be described.

The assembly 10 includes an equipment platform or support 12, constructed of steel plating, for example, so as to be floatable and suitably buoyant in order to support the various equipment carried by it. The equipment support 12 may be provided with an inclined bow portion 14 to make it pass through the water easily. A railing (not illustrated) may be provided around the support 12 as a safety precaution for the personnel who will occupy it.

Figure 2:
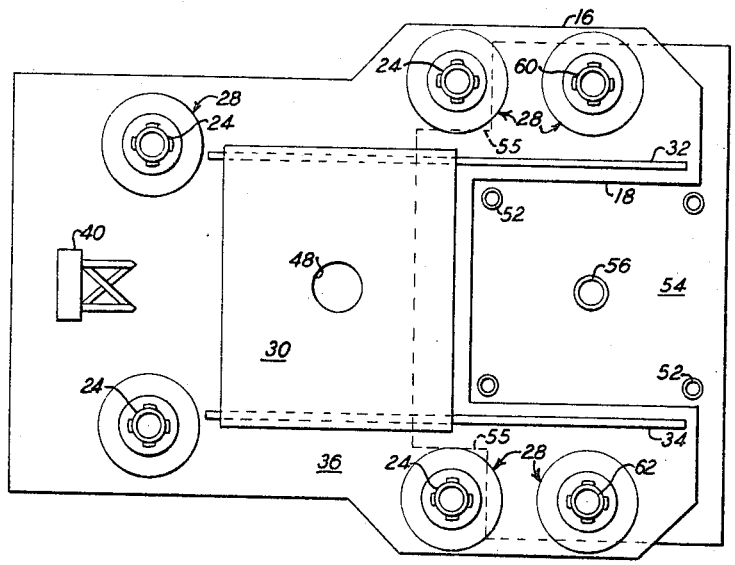
FIG. 2 is an end elevational view corresponding to FIG. 1.

The stern portion 16 (FIG. 3) of the support 12 may be made wider than the bow portion so that the support 12 may be provided with a relatively large slotted portion 18. If desired, the center portion 20 (FIG. 2) may be made to be shallower than the outside edge portions.

The support 12 is provided with vertically extending column or caisson members 24 located along the sides thereof. The column members 24 extend through vertical openings or holes 26 provided in the support 12. It should now be apparent that the enlarged stern portion 16 may be provided to accommodate the column members which are adjacent the slotted portion 18 of the support 12, and that the shallow center portion 20 of the support 12 serves to lessen the total weight of the support due to the fact that a relatively large vertical bearing surface is desired along the inside of the openings 26 in the sides of the column members 24.

The support 12 is provided with a jack system which will be described in detail hereinafter. A brief description of the jack system will now be given so as to facilitate an explanation of the operation of the complete assembly 10. The jack system includes separate jack devices 28 located on the equipment support 12 at each point where a column member 24 passes through the support. Each jack device 28 serves to effect relative movement between a column 24 and the equipment support 12, and each jack device 28 can be actuated independently of the others. Usually, however, they are operated in unison.

When the assembly 10 is in towing position as illustrated in FIG. 1, the columns 24 are elevated by the jack devices 28 to a position wherein the columns 24 extend above the equipment support 12. The columns 24 are thereby raised out of the water and resistance as the assembly 10 passes through the water is lessened. After the assembly 10 has been towed to the desired offshore location, the jack devices 28 can be actuated so that the columns 24 will be lowered through the openings 26 and pass downwardly toward the floor of the body of water. After the columns 24 become firmly embedded in the floor B, the jacking operation is continued so that the equipment support 12 is elevated on the columns 24 to a position above the surface of the water. The elevated position of the equipment support 12 is illustrated in FIG. 4. Because the assembly 10 may be used on bodies of water where heavy wave action may occur, the equipment support 12 may be elevated high enough above the surface of the water so as to be above the waves which may develop. The columns 24 are cylindrical in shape and therefore offer little resistance to the wave force. Therefore, once the columns 24 have been lowered and the equipment support 12 elevated, storms which may arise on the water can do little damage to the assembly 10.

The jack devices 28 may be actuated so that the equipment support 12 will be lowered to the surface of the water and the columns 24 raised to the towing position illustrated in FIG. 1. The assembly 10 can then be towed to a different drilling location. Additional features of the jack devices 28 will be explained in detail as the description of the invention proceeds.

The equipment support 12 is provided with a bed structure 30 which is equipped with a power mechanism (not illustrated) so as to move the bed along a track comprised of rails 32 and 34 located on an upper deck 36 of the equipment support 12. As illustrated in FIG. 3, the rails 32 and 34 extend from the center portion of the equipment support 12 along opposite sides of the slotted portion 18. A mast or spar structure 38 is provided on the equipment support 12 and can assume a lowered position (FIG. 1) where it rests on a prop 40, or it may be raised to an elevated position (FIG. 4). A pivot connection 42 is provided between the lower end portion of the mast 38 and a frame member 44 located on the bed 30. Power mechanism (not illustrated) is provided for raising and lowering the mast 38. A hoisting mechanism 46 and the necessary cable and pulley equipment are provided in connection with the mast 38 to carry out the drilling operations. The bed 30 is provided with a hole 48 (FIG. 3) for passage therethrough of the various drilling equipment such as drill rods, casings, etc.

The assembly 10 includes a well-support stand 50 (shown in perspective in FIG. 5) comprising generally vertically extending tubular members 52 and suitable cross bracing members 53. The members 52 rest upon a mat 54 which may be made hollow and water tight so as to be buoyant and which may be provided with conventional equipment for filling the mat with water to aid in the lowering of the stand 50. The mat 54 is generally rectangular in shape and, as illustrated in FIG. 3, extends substantially the width of the stern portion 16 of the equipment support 12. Two of the corners of the mat 54 may be cut out as indicated at 55 so that the two middle columns 24 may be extended downwardly without interfering with the mat 54. The stand 50 is provided with a vertically extending pipe member 56 which extends through the mat 54. Certain of the bracing members 53 connect the pipe 56 to the tubular members 52.

The mat 54 is provided with holes 58 (FIG. 5) which extend therethrough. The holes 58 receive the lower end portions of the two stern-most columns 60 and 62. Lock mechanisms 64 located adjacent the holes 58 and inside the mat 54 provide a releasable connection between the lower portions of the columns 60 and 62 and the mat 54. During the towing operation, the lock mechanisms 64 hold the mat 54 securely to the lower portions of the columns 60 and 62. The locks 64 may be actuated so that the columns 60 and 62 may be withdrawn from the holes 58, and the stand 50 then may be separated from the equipment support 12. The locks 64 may be actuated by underwater divers, or provided with apparatus for actuating them remotely from the platform 12.

During the towing operation, the various members of the assembly 10 are in the position illustrated in FIG. 1. The assembly 10 then may be towed to the desired offshore drilling location. It should be noted that the various column members 24 are in elevated position, that the mat 54 is secured to the lower end portions of the columns 60 and 62, and that these columns 60 and 62 are raised so that the well-support stand 50 is raised, and that the tubular members 52 extend upwardly through the slotted portion 18 of the equipment support 12. The bed 30 is located near the center portion of the equipment support 12 and the mast 38 is lowered so as to rest on the prop 40.

After the desired offshore drilling location has been reached, the jack devices 28 associated with the columns 24 are actuated so as to lower the columns 24 to the floor of the body of water. Then, the jack devices 28 associated with the columns 60 and 62 are actuated so that these columns are lowered through the water, together with the well-support stand 50 until the mat 54 bears firmly upon the floor.

The operation of the jack devices 28 is continued so that the equipment support 12 is raised on the columns 24, 60 and 62 above the surface of the water. After the equipment support 12 has been raised the desired height, the jack devices 28 can be operated independently so as to make level the deck 36 of the equipment support 12.

Once the equipment support 12 has been elevated, the bed 30 may be moved along the rails 32 and 34 over the slotted portion of the equipment support 12, and the mast 38 may be raised into operating position. The position of the bed 30 can be adjusted so that the hole 48 in the bed 30 is vertically aligned with the pipe 56 of the stand 50. The hoisting mechanism 46 may then be used to lower the various drilling equipment through the hole 48 and pipe 56 to carry out the drilling operation. In FIG. 4, a well casing 66 is shown as extending downwardly from the stand 50.

In the event that a producing well is established, the jack devices 28 may be actuated to lower the equipment support 12 to the surface of the water. The locks 64 may be actuated to release the lower end portions of the columns 60 and 62 from the mat 64. By continuing to operate the jack devices 28, the columns 24, 60 and 62 can be raised out of the water to towing position where they extend above the equipment support 12. The equipment support 12 may then be towed away from the well-support stand 50, leaving the stand by itself to serve as a production support to protect the well casing and to carry the necessary production apparatus.

The equipment support 12 may then be towed back to port where it may be outfitted with another well-support stand similar to the stand 50 and then towed to another offshore location where the erection procedure may be repeated. Instead of towing the equipment support 12 back to port, another stand similar to 50 may be towed out and fitted into the equipment support 12.

The equipment support 12 may be equipped with only the apparatus necessary to carry out a drilling operation. This may include, in addition to the traveling bed 30 and the mast 38, electric powered draw works, rotary table, stand-by mud pumps, and a limited electric generating plant, for example. Such an arrangement requires that the equipment support 12 be only of limited size, and therefore, the support is very mobile. A tender ship may be anchored adjacent the assembly 12 during the drilling operation and may supply the additional equipment necessary for the drilling operation, such as mud pits, mud pumps, electric generators for drilling, living quarters for operating personnel, water supply, fuel supply, etc.

If a producing well is established and the stand 50 left by itself to serve as a production platform, the stand can be provided afterwards with the necessary apparatus such as pumps, tanks, etc. for maintaining production of the well. Those skilled in the art will readily appreciate that this procedure eliminates the need for constructing a drilling platform for a wildcat or exploratory well that may or may not establish production, and yet have a production platform in place if production is obtained.

If a producing well is not established by the drilling operation, the assembly 10, including the stand 50, can be moved to a new drilling site. In this event, the locks 64 are not actuated so as to release the lower end portions of the columns 60 and 62 from the mat 64, but instead, these columns and the mat remain connected. The jack devices are actuated so as to lower the equipment support 12 to the surface of the water. The bed 30 is moved to the center portion of the equipment support 12 and the mast 38 lowered onto the prop 40. The jack devices 28 are operated so as to raise the columns 24, 60 and 62 together with the stand 50 from the floor of the body of water. The raising of the columns 60 and 62 will pull the stand 50 back up into the slotted portion 18 of the equipment support 12. After the columns 24, 60 and 62 have been raised to the position illustrated in FIG. 1, the assembly 10 can be towed to a new drilling site.

In FIGS. 6–8 there is disclosed another embodiment of this invention. A support assembly 80 is illustrated in FIG. 6 in position to be towed to an offshore drilling site. The assembly 80 includes an equipment support 82 having an inclined bow portion 84 and a slotted portion 86 at the stern.

The support 82 is supplied with two groups of vertically extending columns or caisson members 90 and 92. The columns 90 are located toward the bow of the equipment support 82 and along the sides thereof. The columns 92 are located toward the stern of the equipment support 82 and adjacent the slotted portion 86. The columns 90 and 92 extend through openings or holes 94 provided in the support 82.

Buoyancy tanks 96 are placed beneath the support 82 and are provided with openings 98 through which the lower end portions of the columns 90 and 92 extend. Flange members 99 are fixed to the extreme lower end of the columns 90 and 92, and serve to hold the buoyancy tanks 96 in position on the lower end portions of the columns 90 and 92.

The jack system of the equipment support 82 includes a series of jack devices 100 located on the equipment support, there being one jack device adjacent each of the columns 90 and 92. The jack devices 100 are identical to and serve the same function as the jack devices 28 previously decribed. The jack device 100 provide relative movement between the column members 90 and 92 and the equipment support 82, and may be operated independently of one another.

A bed structure 102 is movable on a track formed of rails 104 which extend from the center portion of the equipment support 82 along opposite sides of the slotted portion 86. A derrick structure 106 is mounted on the bed 102 and is equipped with the necessary equipment such as hoisting mechanism, cables, etc., in order to carry out the drilling operations. A power mechanism (not illustrated) is provided for moving the bed 102 together with the derrick 106 along the rails 104.

The assembly 80 includes a well-support stand 110 constructed of vertically extending tubular members 112 and a series of bracing members 114. Gusset plates 118 connect the lower end portions of the members 112 and the lowermost horizontal bracing member 114 so as to give additional strength to the lower portion of the stand 110 and stabilize the stand when penetrated in the bottom. A center pipe 120 extends vertically through the middle of the stand 110 and is connected to the members 112 by additional cross-bracing members. Piling members 122 extend through each of the tubular members 112 and are prevented from sliding through the members 112 by stops 124 which are tapered and slightly larger in diameter than the members 112. The stops 124 can be removed when desired so that the piling members 122 can pass through the tubular members 112.

A group of hanger bars 130 extended horizontally between the upper portion of the columns 92 and the stand 110. The bars are connected to rings 132 which are attached to the columns 92 and to similar rings 133 which are attached to the members 112 of the stand 110. The hanger bars 130 are suitably strong so as to carry the entire weight of the stand 110. The bars 130 and rings 132 and 133 may be removed so that the stand 110 may be separated from the equipment support 82 when desired.

During the towing operation, the various members of the assembly 80 are positioned as illustrated in FIGS. 6 and 7. The columns 90 and 92 are in the elevated position wherein they extend above the equipment support 82. The traveling bed 102 and derrick 106 are located near the center portion of the support 82. The stand 110 is located within the slotted portion 86 of the equipment support and is supported in elevated position by the columns 92 through the hanger bars 130 and rings 132 and 133. The buoyancy tanks 96 located beneath the equipment support 82 give additional buoyancy to the assembly 80 during the towing operation.

After the assembly 80 has been towed to the desired offshore drilling location, the jack devices 100 associated with the columns 90 may be actuated to lower the columns toward the floor of the body of water. Then, the jack devices 100 associated with the columns 92 may be actuated to lower the columns 92 together with the stand 110 towards the floor of the body of water. The buoyancy tanks 96 are carried downwardly through the water with the lower end portions of the columns 90 and 92 after the columns have passed a short distance through the tanks until lugs 140 near the lower ends of the columns contact the tanks and prevent further relative movement therebetween. The columns 90 and 92 penetrate the floor, which often is of soft material, and the buoyancy tanks 96 remain on the surface of the floor to give additional bearing to the columns. When columns 90 and 92 meet sufficient bottom resistance, the jacks 100 elevate the barge 82 to the desired height above the path of waves.

After the stand 110 comes to rest on the floor, the stops 124 may be removed from the members 112 so that the piling members 122 may be driven through the members 112 into the floor to anchor firmly the stand 110. The bed 102 may be moved on the rails 104 over the slotted portion 86 so that the derrick 106 is directly above the stand 110. The hoisting mechanism of the derrick 106 may be used to lower equipment such as drill rods, well casings, etc. through the center pipe 120 of the stand 110 to carry out the drilling operation.

In FIG. 8, the assembly 80 is illustrated in the drilling position. A well casing 144 extends downwardly through the center pipe 120. A blow out preventer 146 may be provided at the upper end of the stand 110. In the event that a producing well is established, the hanger bars 130 having been removed from the columns 92 and the stand 110, the stand is separated from the equipment support 82. The jack devices 100 may be actuated to lower the equipment support 82 to the surface of the water, and to raise the columns 90 and 92 to their elevated position so that the equipment support 82 may be towed to a new location. If a producing well is not established, the hanger bars 130 will be attached to rings 132 and 133 and the stand 110 may be raised to its elevated position within the slotted portion 86 and moved with the equipment support 82 to a new drilling site.

If the stand 110 is left in position to serve as a production platform, it may be equipped with a deck for supporting the necessary production equipment and personnel. Fenders 150 may be mounted on brace members 152 at the sides of the stand 110 to accommodate boats which may anchor at the production platform.

Because the stand 110 has an open bottom portion, several directional drill wells can be made conveniently from a single stand. In this respect, the stand 110 may be provided with several guide pipes, such as the guide pipe 120. If desired, the upright members 112 and bracing members 114 of the stand 110 could be made of a non-corrosive material such as aluminum, for example, in order to offset the corrosive effect of the water, and also to lessen the weight of the stand.

Still another embodiment of this invention is illustrated in FIG. 9. On occasions, it is necessary to re-work oil wells which have been established previously. In this event, it is necessary that drilling and hoisting equipment be towed to the production platform of wells located at offshore locations. Certain modifications can be made to the equipment previously explained in order that this equipment may carry out reworking operations on established oil wells.

An equipment assembly 170 which is similar to the assemblies 10 and 80 described above may be towed to an offshore location adjacent to an established production platform. The assembly 170 includes an equipment support 172 provided with vertically extending column members 178 which pass through openings 180 in the equipment support 172. Jack devices 186 are located on the equipment support adjacent each of the column members 178 and produce relative movement between the columns 178 and the equipment support 172 in order to lower the columns to the floor of the body of water and then raise the equipment support 172 on the columns. This procedure is carried out in the same manner as described with respect to the assemblies 10 and 80.

The equipment support 172 is provided with a bed 190 which can travel along a track formed by rails 192. A derrick structure 194 is mounted upon and moves with the bed 190. The bed 190 and the derrick 194 are positioned near the center portion of the equipment support 172, during the towing operation, as illustrated in broken lines in FIG. 9. Suitable apparatus such as hoisting mechanism, cables, etc. are provided for the derrick 194 in order to carry out the re-working operations.

An extension structure 200 is mounted at the stern portion of the equipment support 172 by a connection 202 which allows the extension structure 200 to be swung upwardly into a towing position or swung downwardly to a horizontal position. The towing position of the extension 200 is illustrated in FIG. 9 by broken lines, and the horizontal position is illustrated by full lines.

A shelf 206 mounted to the bottom portion of the stern of the equipment support 172 affords a lower bearing area for the bottom of the extension 200. A number of adjustable legs 210 extend from the bottom portion of the extension 200 and can be adjusted to various desirable lengths. The top of the extension 200 is provided with rails 212 so that when the extension is moved to its horizontal position, the rails 212 are in effect a continuation of the rails 192 which are on the equipment support 172.

A typical production platform 220 located offshore may be firmly anchored to the floor of the body of water by piling 222 and equipped with a center pipe 224 through which may pass a well casing 226. Should it become necessary to re-work the well which has been established at the production platform 220, the assembly 170 is towed into position adjacent the platform. The stern portion of the equipment support 172 is turned so that it is next to the production platform 220.

The jack devices 186 are then actuated to lower the columns 178 to the floor of the body of water and then to elevate the equipment platform 172 on the columns 178. The equipment platform 172 is elevated to a height where it is somewhat above an upper deck 228 of the production platform 220, as illustrated in FIG. 9.

The extension 200 is then swung from its towing position downwardly so that it is substantially parallel to, and above, the deck 228. The legs 210 on the extension 200 may be adjusted so that they rest upon the deck 228 in order to support the extension 200 thereon. With the extension 200 now in its horizontal position, the rails 192 and 212 are aligned. The bed 190 and the derrick 194 may be moved along the rails 192 and 212 so that the derrick is positioned directly above the production platform 220, as illustrated in full lines in FIG. 9. The hoisting mechanism of the derrick 194 then may be used to carry out the necessary re-working operations on the well.

After the re-working operations have been completed, the bed 190 and the derrick 194 may be moved back onto the equipment support 172, the extension 200 may be raised to its towing position, and the jack devices 186 may be actuated to lower the equipment support 172 to the surface of the water and to elevate the columns 178 to their towing position where they extend above the equipment support 172. The equipment assembly 170 may be towed to another production platform similar to the platform 220 to perform whatever re-working operation may be necessary. If desired, a mast or spar type of structure such as the mast 38, previously described, may be used in connection with the traveling bed 190 rather than the derrick structure 194.

Turning now to FIG. 10, there is illustrated portions of a column, an equipment support, and a jack device. Although particular reference is made to the equipment assembly 10 and the jack device 28, it should be understood that the jack devices 100 and 186 of the equipment assemblies 80 and 170, are identical to the jack device 28. Similarly, the columns 24 of the equipment assembly 10 are identical to the columns 90, 92 and 178 of the equipment assemblies 80 and 170.

The column 24 is provided with a series of rectangular lugs 250 which may be attached thereto as by welding. A group of four such lugs 250 are spaced apart an equal distance circumferentially around the column 24 at a given height and there are several groups of lugs 250 spaced apart an equal distance along the length of the column. The lugs 250 are aligned in four parallel rows which extend longitudinally along the column 24.

The column 24 passes through the upper deck 36 of the equipment support 12 and through a sub-deck 256 which is immediately below the upper deck 36. The opening 26 is provided to accommodate the passage of the column 24 and is formed by members 258 which extend the vertical distance from the upper deck 36 to the bottom portion of the equipment support 12. A guide device 260 located within the opening 26 is equipped with rollers 262 which guide the column 24, maintain it in vertical alignment, and allow the column 24 to move easily through the opening 26. Additional guide devices 260 with rollers 262 may be provided at spaced apart distances along the vertical dimension of the opening 26.

The jack device 28 is located on the equipment support 12 immediately adjacent the column 24. The upper portion of the jack device 28 includes a yoke assembly 270 which is illustrated in detail in FIGS. 11–14. The yoke assembly 270 comprises two spaced apart annular ring members, an upper ring 272 and a lower ring 274. The rings 272 and 274 surround the column 24 and are of a diameter which is substantially greater than the diameter of the column. Four plate members 276 are spaced equal distances apart circumferentially around the yoke assembly 270 between and adjacent to the outside edges of the rings 272 and 274. Curved plate sections 278 form an inner sleeve for the yoke assembly 270. The plate sections 278 are adjacent to and only slightly larger in diameter than the column 24, and are connected to the rings 272 and 274 by a suitable number of radially extending brace plates 280. The sleeve formed by the curved plate sections 278 is not continuous, but is broken away at points adjacent the plate 276, so that the lugs 250 on the column 24 may pass the yoke assembly 270. The members 272, 274, 276, 278 and 280 which make up the yoke assembly are secured together as by welding to form a rigid structure.

Vertically extending parallel grooves 281 are provided in the inner face of the curved plate sections 278 at circumferentially spaced-apart intervals. These grooves receive longitudinal, protruding guides 282 which are positioned lengthwise along the columns. The guides 282 prevent the yoke assembly 270 from rotating around the column 24 and also hold the assembly aligned in a plane perpendicular to the column.

Figure 12:
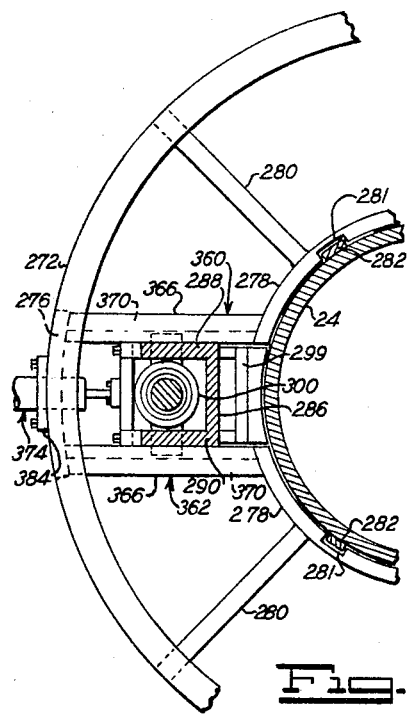
FIG. 12 is a fragmentary sectional plan view taken along line 12—12 of FIG. 11.

The yoke assembly 270 supports four lift head assemblies 284 which are spaced apart equal distances circumferentially around the yoke assembly 270 and aligned with the lugs 250 on the column 24. Each lift-head assembly includes a center portion made up of two parallel, spaced-apart sections 288 and 290 which are joined by a short cross piece 286 (FIGS. 12 and 14). At their top portions, the parallel sections 288 and 290 terminate in a horizontally extending block 292 and at their bottom portions they terminate in a similar block 294. The blocks 292 and 294 extend radially inwardly so as to have a top bearing surface 296 and a lower bearing surface 298 which may engage the lugs 250 on the column 24. Upper and lower cross plates 299 join the sections 288 and 290 adjacent the blocks 292 and 294.

Disposed between each of the parallel sections 288 and 290 of each lift-head 284 there is a ball bearing unit 300 through which extends one of four vertically extending lift-shafts 304. As illustrated in FIG. 14, each of the ball bearing units 300 has internal thread portions 306 and each of the lift-shafts 304 has external thread portions 308 which cooperate to receive a number of steel balls 310. The large number of balls 310 provide a relatively large total bearing area between the ball bearing units 300 and the lift-shafts 304.

As will be described hereinafter, relative movement between the lift-shafts 304 and the lift-heads 284 is created by rotating the lift-shafts 304. Because of the small amount of friction created by the rotating balls 310, the lift-shafts 304 are free to rotate in the ball bearing units 300. A vertically extending passage 314 through the ball bearing units 300 allows the balls 310 to pass from the top to the bottom, or vice versa, of the ball bearing units as the lift-shafts 304 are rotated, either clockwise or counter-clockwise. All of the lift-head assemblies and the ball bearing units are identical, therefore, a description will be given only of one of the lift-heads and ball bearing units.

A service plate 316 (FIG. 13) is attached to the ball bearing unit 300 as by bolts 318. The plate 316 may be removed so that the balls 310 may be replaced if necessary. Each ball bearing unit 300 is held in place between the parallel sections 288 and 290 of the lift-head 284 by means of parallel, spaced apart, vertically extending holder plates 322 and 324; and a back up plate 326 (FIG. 13). As illustrated in FIG. 14, the section 288 is notched at 330 in order to receive an extension 332 of the holder plate 322. The section 290 has a notch (not shown in the drawings) identical to the extension 332. A suitable number of bolts 336 firmly secure the holder plates 322 and 324 to the respective sections 288 and 290. The back edge of each of the holder plates 322 and 324 are notched at 340 in order to receive the back up plate 326 which extends horizontally between the two holder plates 322 and 324. Bolts 342 firmly attach the back up plate 326 to the holder plates 322 and 324.

The ball bearing unit 300 is provided with trunnion members 350 and 352 which extend horizontally from opposite sides thereof. The section 288 of the lift-head 284 is provided with a semi-circular notch 354 which cooperates with a semi-circular notch 356 provided in the holder plate 322 to define a circular opening. The circular opening provided by the notches 354 and 356 loosely receive the trunnion 350. A notch (not shown in the drawings) identical to the notch 354 is provided in the section 290 and a notch identical to the notch 355 is provided in the holder plate 324 so that they define a circular opening which receives the trunnion 352.

As illustrated in FIG. 13, the trunnions 350 and 352 extend a distance beyond the sides of the sections 288 and 290. The outwardly extending portion of the trunnions 350 and 352 are received in horizontally extending tracks or channel sections 360 and 362 which are made up of upper and lower flange members 366 and 368 and web members 270. The trunnion members 350 and 352 are free to rotate within the channels 360 and 362, and also, are free to move radially towards and away from the column 24, being guided by the channels 360 and 362 which are rigidly attached at their inner ends to the sleeve 278 (FIG. 12) and at their outer ends to the plate 276 and the rings 272 and 274. Consequently, the lift-head 284 can be moved inwardly so that the blocks 292 and 294 may engage the lugs 250 on the column 24, and the lift-head 284 may be moved outwardly so that the blocks 292 and 294 will not engage the lugs 250 on the column 24.

Movement of the lift-head 284 is controlled by a power assembly 374 which includes a pressure cylinder 376 containing a piston (not illustrated) to which is attached a piston rod 378. The cylinder 376 passes through a hole 382 in a plate 384 and through a hole 386 in the plate 276. The cylinder 376 is rigidly attached to the plate 384 as by welding, and the plate 384 is attached to the rings 272 and 274 as by bolts 388. A universal connection between the back up plate 326 and the free end of the piston rod 378 is provided by means of a disc 392 bolted to the back up plate 326 and having therein a socket in which a ball 394 secured to the free end of the piston rod 378 may rotate.

Operation of the cylinder assembly 374 may be effected to extend the rod 378 so that the lift-head 284 will be moved radially inwardly toward the column 24, or the cylinder assembly 374 may be operated to retract the rod 378 so that the lift-head 284 may be moved radially outwardly away from the column 24.

Latch assemblies 400 and 402 are provided at the top and the bottom portions, respectively, of each of the lift-heads 284. The assemblies 400 and 402 on each lift-head 284 are identical and each has fluid pressure cylinders 404 and 406 mounted to the outside of sections 288 and 290, respectively, as shown in FIGS. 13 and 14. The cylinders 404 and 406 have piston rods 408 which extend parallel to slots 410 and 412 in the sections 288 and 290. A bar 414 which is rigidly attached to the free end of the piston rod 408 of the cylinder 404, and a similar bar 416 which is rigidly attached to the piston rod of the cylinder 404 are rigidly attached to opposite sides of a rectangular latch block 420. The bars 414 and 416 slide in and are guided by the slots 410 and 412 and the block 420 slides through a rectangular opening 421 in the cross plate 299. The cylinders 404 and 406 are substantially horizontal and may be actuated by fluid pressure to extend or retract the piston rods 408 so that the block 420 may be moved radially towards or away from the column 24.

Each of the lugs 250 on the columns 24 are provided with a rectangular opening 424 (FIG. 14) which may receive a latch block 420. The blocks 420 cooperate with the sides of the openings 424 in the lugs 250 and the sides of the openings 421 in the cross plates 299 to prevent rotational movement of the yoke assembly 270 around the column 24, and also to increase the horizontal bearing area between the lift-heads 284 and the lugs 250.

Figure 11:
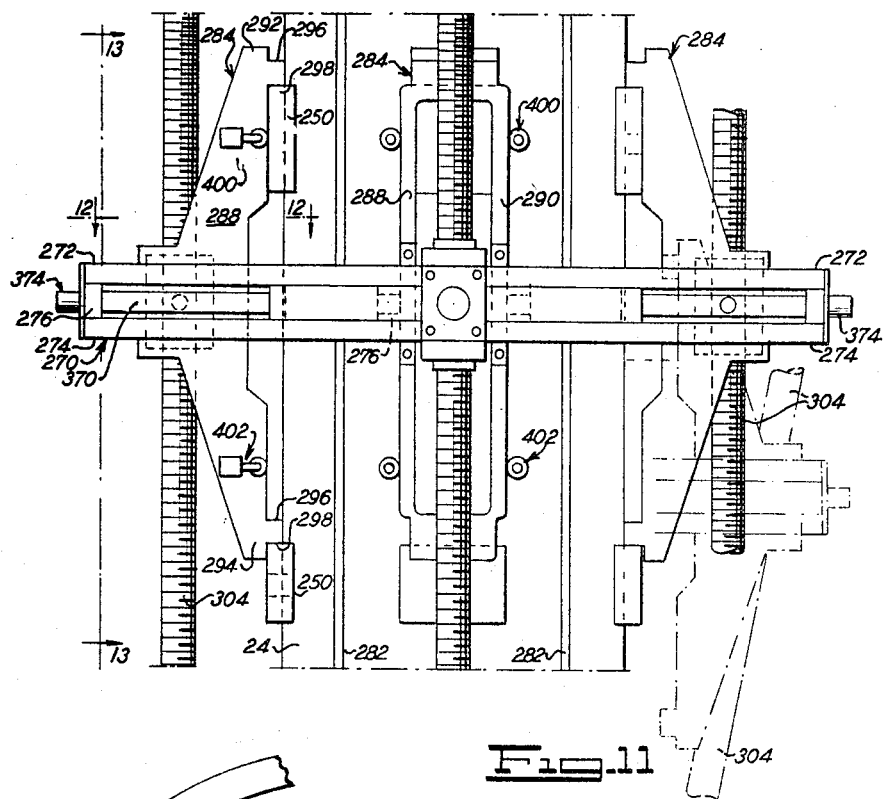
FIG. 11 is a fragmentary elevational view showing the relationship between the upper portion of a jack device and a column member.

In FIG. 11, the lift-heads 284 are shown by full lines in position so that the lower bearing surfaces 298 of the blocks 292 and 294 rest upon lugs 250 of the column 24. At the right-hand side of FIG. 11, a lift-head 284 is shown by broken lines in position after it has been moved radially away from the column 24 by its power assembly 374. Also, the right-hand lift-shaft 304 has been rotated so that the lift-head has moved a short distance downwardly along the lift-shaft. The broken lines, of course, illustrate only a portion of the yoke assembly 270.

Referring again to FIG. 10, there is shown a housing 440 within which there is located the lower portion of the jack device 28. The lift-shafts 304 extend downwardly from the yoke assembly 270 through slotted openings 442 in the top of the housing 440.

At the bottom portion of each of the lift-shafts 304 there is a locking assembly 446. Each of the locking assemblies 446 comprise two vertically extending lock-shafts 448 and 450 and one lock-block unit 454. A lock-block unit 454 and portions of the lift-shaft 304 and lock-shafts 448 and 450 are illustrated in detail in FIGS. 15, 16 and 17.

Considering for a moment the lock-shafts 448 and 450 illustrated in FIG. 10, the upper portions of the lock-shafts 448 and 450 are journaled in bearing mounts 458 which have pins 460 extending from the sides thereof through slots 462 provided in parallel, spaced-apart plates 464 rigidly fastened to the underside of the top of the housing 440. The slots 462 allow the top portions of the lock-shafts 448 and 450 to be moved towards and away from the columns 24. The lock-shafts 448 and 450 extend downwardly from the bearing mounts 458 and pass through a block unit 454.

Each lock-block unit 454 comprises a casing 468 within which there is a block 470 having a radially directed extension 472 which may engage a lug 250 on the column 24. At opposite sides of the block 470 there are nut devices 476, each of which has a stub shaft 478 which extends horizontally toward the block 470 and is received within holes 482 provided in the block 470. Each of the nut devices 476 receives one of the vertically extending lock-shafts 448 and 450. The lock-shafts 448 and 450 are provided with external threads which cooperate with internal threads provided in the nut devices 476 so that when the lock-shafts 448 and 450 are rotated, relative longitudinal movement between the shafts and the nut devices is achieved. These threads may be ajax type threads, for example, or a ball bearing unit such as the unit 300 described above may be used in connection with the nut devices 476 and lock-shafts 448 and 450.

Figure 15:
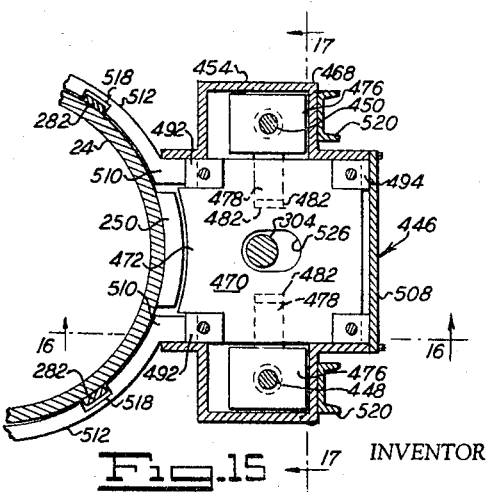
FIG. 15 is a sectional plan view of a block head unit taken along line 15—15 of FIG. 10.

As illustrated in FIGS. 15, 16 and 17, each of the sides of the block 470 have oppositely inclined wedge faces 488 and 490. Pairs of wedge members 492 and 494 are located for slidable engagement with wedge faces 488 and 490, respectively. Fluid pressure operated cylinder devices 496 and 498, secured to the casing 468 above the block 470, are connected by rods 502 and 504 to the wedge members 492 and 494, respectively, to move them upwardly or downwardly. When the cylinder devices 496 are actuated to extend the rods 502, downwardly, the wedge members 492 bear against the wedge faces 488 to move the block 470 radially away from the column 24 a sufficient distance so that the extension 472 of the block 470 will not engage one of the lugs 250 on the column 24. Conversely, when the cylinders 498 are actuated to extend the rods 504, the wedge members 494 will engage the wedge faces 490 to move the block 470 radially towards the column 24 so that the extension 472 will be in position to engage one of the lugs 250 on the column 24. When the wedge members 492 are moved downwardly, the wedge members 494 are moved upwardly, and vice versa. The wedge members 494 react against a back up plate 508 attached as by bolts to the rear of the casing 468. The wedge members 492 react against radially extending flange portions 510 of a sleeve 512 which surrounds the column 24.

The sleeve 512 is slightly larger in diameter than the column 24 and is made up of curved plates which are spaced apart so as to leave room for the passage of the lugs 250. The several lock-block units 454 are fixed to the sleeve 512 as by welding. The inside face of the sleeve 512 is provided with vertically extending parallel grooves 518 which receive the guides 282 on the column 24 so as to prevent the sleeve 512 from rotating around the column. Vertical channels 520 (FIG. 15) extend from the top of the housing 440 to the deck 36 and bear against the back of the casing 446 of the lock-block units 454. The channels 520 serve to guide the vertical movement of the lock-block units and to give rigidity to the housing 440. The channels 520 have been omitted from FIG. 10 for clarity.

The lift-shafts 304 extend through slotted openings 526 provided in the block 470. The opening 526 is sufficiently large so that there would be no engagement between the lift-shaft 304 and the block 470. Additional slots 528 are provided in the casing 468 for passage therethrough of the lift shafts 304. Similar slotted openings 530 are provided in the casing 446 for the passage therethrough of the lock-shafts 448 and 450.

The power mechanism for operating the jack device 28 is located on the equipment support 12 within the housing 440. As illustrated in FIG. 10, each of the lift-shafts 304 extend downwardly from the yoke assembly 270, substantially parallel to the column through the slots 442 in the housing 440, through the slots 526 and 528 in the block 470 and the casing 446, and then through slots 532 in the upper deck 36. On the sub-deck 256 there is a power unit 540 for each of the lift-shafts 304. Each lift shaft 304 is provided with a universal joint 542 in its portion which extends between the lock-block unit 454 and the power unit 540. This allows the lift-shafts to be pivoted away from the column 24.

One type of power unit 540 which may be employed to rotate the lift shafts 304 is illustrated in FIG. 10 in connection with the lower end portion of the left-hand shaft 304. The power unit 540 may include a gear 546 attached to the lower end portion of the lift-shaft 304 and driven by a worm gear shaft 548 rotated by a low horsepower electric motor 550 through a gear box and clutch (not illustrated). Suitably strong bearing members 556 provide a rotatable connection between the gear 546 in the deck 256. Each power unit 540 may be of similar construction. All of the power units 540 are operated in unison so as to rotate the respective lift-shafts 304 simultaneously. Thus, each of the lift-shafts 304 are free to rotate about a substantially vertical axis, but are prevented from moving vertically with respect to the support 12.

As explained above, the locking assembly 446 includes two lock-shafts 448 and 450 and one lock-block unit 454 associated with each of the lift-shafts 304. Each lockshaft 448 and 450 extends downwardly from a bearing mount 458 through the lock-block units 454 to a power unit 560 on the upper deck 36. Each lock-shaft 448 and 450 is provided with a universal joint 562 with its portion which extends between the lock block unit 454 and the power unit 560.

A type of power unit 560 which may be employed to rotate the lock shafts 448 and 450 is illustrated in FIG. 10 in connection with the right hand lock shaft 448. The power unit 560 may include a gear 564 mounted to the lower end portion of the lock shaft 448 and driven by a worm gear 556 rotated by a low horsepower electric motor 568 through a gear box clutch (not illustrated). Suitably strong bearing members 570 provide a rotatable connection between the gear 564 and the upper deck 36. Each of the lock-shafts 448 and 450 may be provided with such a power unit 560, or if desired, a gearing arrangement may be provided so that one electric motor such as 568 may be used to rotate the two lock-shafts 448 and 450 associated with one of the locking assemblies 446, or all of the lock-shafts in each jack device 28. The lock-shafts 448 and 450, like the lift-shafts 304, are free to rotate about a substantially vertical axis, but prevented from moving vertically with respect to the support 12.

The several jack devices 28, 100 and 186 employed in connection with the equipment assemblies 10, 80 and 170 are identical, although particular reference has been made to the jack device 28 used with the equipment assembly 10. The operation of the jack devices is as follows.

The jack devices 28 are used to cause relative movement between the columns 24 and the equipment support 12. When the equipment support 12 is on the surface of the water, the jack devices 28 may be operated to raise the columns 24 out of the water to an elevated position above the equipment support 12, or the jack devices can be operated to lower the columns 24 through the water so that the columns 24 may be brought to rest on the floor of the body of water. Also, the jack devices may be operated to raise the equipment support 12 on the columns 24 above the surface of the water, and then to lower the support 12 back onto the water.

For example, in order to raise the equipment platform 12 on the columns 24 and above the surface of the water, the lift shafts 304 are rotated by the power units 540 so that the yoke assembly 270 will be moved in screw fashion to the top portion of the lift-shafts 304 to the position illustrated in FIG. 10. The lower bearing surfaces 298 of the blocks 292 and 294 on all of the lift-heads 286 are brought into engagement with the top surfaces of two of the vertically spaced groups of lugs 250 on the column 24. Inward radial movement of the lift-heads 286, for bringing the blocks 292 and 294 into engagement with the lugs 250, is accomplished by actuating the cylinder assemblies 374 to extend the rods 378. The latch assemblies 400 are activated to move the blocks 420 into the openings 424 in the lugs 250 which are engaged by the blocks 292.

The power units 540 are actuated to rotate the lift-shafts 304 so that they move in screw-type fashion through the ball bearing units 300 in an upwardly direction. Because the lower end portion of the lift-shafts 304 are firmly secured to the equipment support 12 through the bearing members 556, the entire equipment support 12 will be pulled upwardly, as long as the rotating movement of the lift-shafts 304 continues.

This rotating movement of the lift-shafts 304 may be continued until the lower limit of the threaded portion of the lift-shafts 304, which is just above the housing 440, reaches the ball bearing units 300.

The latching mechanisms 400 then may be withdrawn, after which the cylinder assemblies 374 may be actuated to retract the rods 378 in order to move the lift-heads 284 radially away from the column 24 and disengage the blocks 292 and 294 from the lugs 250. Reverse rotation may then be applied to the lift-shafts 304 to move the yoke assembly 270 once again to the top of the lift-shafts 304 so that another lift stroke may be made.

While the yoke assembly is being returned to the top of the lift-shafts 304, it is necessary that the equipment platform be locked to the column 24. This is accomplished by the locking assembly 446 which, during a lift stroke of the yoke assembly 270, remains inoperative.

In order to lock the equipment support 12 to the columns 24, the wedge member 494 of the lock-block units 454 are lowered and the wedge members 492 are raised in order to push the blocks 470 radially inwardly so that the extensions 472 may engage the top surface of a group of the lugs 250.

Before the weight of the equipment support 12 is transferred from the yoke assembly 270 to the block assemblies 446, it is necessary that the extensions 472 of the lock-blocks 470 rest upon the top of a group of the lugs 250. It may be necessary that vertical adjustment be made to the lock-block units 454. This is accomplished by actuating the power units 560 to rotate the lock-shafts 448 and 450 so that the lock-block units 454 may be run up or down in screw-like fashion on the lock shafts 448 and 450.

During the period in which the yoke assembly 270 is being returned to the top portion of the lift-shafts 304, it is possible that a short lift stroke may be accomplished by running the power units 560 so that the lock-shafts 448 and 450 will be threaded upwardly through the nut devices 476 of the lock block units 454 to pull the equipment support 12 upwardly by means of the bearing 570.

While a lift stroke is being carried out by the yoke assemblies 270 and lift-shafts 304, the lock-block units 446 are disengaged from the lugs 250 on the column 24. This is accomplished by lowering the wedge members 492 and lifting the wedge members 494 so that the block 470 will be moved radially away from the column 24.

In order to raise the column 24 with respect to the equipment support 12 so that the weight of the column 24 is borne by the equipment support, a reverse operation of the jack device 28 is followed. The yoke assembly 270 is positioned at the lower threaded portion of the lift-shafts 304 by rotating the shafts to thread the yoke assembly downwardly. The top bearing surfaces of the blocks 292 and 294 are moved into contact with the bottom surfaces of a group of the lugs 250 by operating the cylinder assemblies 374, and then the latch mechanisms 402 are actuated to move the latch blocks 420 into the openings 424 in the lugs 250. The lift-shafts 304 are rotated to move the yoke assembly 270 upwardly. This causes the lift-heads 284 to push upwardly on the lugs 250 and raise the column 24.

Rotation of the lift-shafts 304 may be continued until the yoke assembly 270 reaches the top portion of the lift-shafts. Then, the latch blocks 420 may be withdrawn from the openings 424, and the lift-heads 284 moved radially outwardly to disengage the blocks 292 and 294 from the lugs 250. The direction of rotation of the lift-shafts 304 is then reversed to return the yoke assembly 270 to the bottom of the threaded portion of the lift-shafts so that another lift stroke can be made to raise further the column 24.

During the return stroke of the yoke assembly 270 to the bottom of the lift-shafts 304, the column 24 is locked to the equipment support 12 by the locking assembly 446. The lock-block units 454 are adjusted along the lock-shafts 448 and 450 by rotating the lock-shafts in either direction. The lock-block units 454 are positioned so that the extensions 472 of the blocks 470 may be moved radially inwardly to engage the bottom surfaces of a group of the lugs 250. A short lift stroke may be carried out during the period in which the yoke assembly 270 is being lowered, by actuating the power devices 560 to rotate the lock-shafts 448 and 450 so as to raise the blocks 470 and consequently the column 24.

The operation of the jack devices 28 to lower the columns 24 with respect to the support 12 or to lower the support 12 with respect to the columns 24 should now be apparent. In order to lower a column 24, the blocks 292 and 294 of the lift-heads 284 are positioned beneath the lugs 250 and the lift-shafts 304 are then rotated to allow the column to move downwardly. In order to lower the support 12, the blocks 292 and 294 of the lift-heads 284 are positioned above the lugs 250 and the lift-shafts 304 are then rotated to allow the support to move downwardly.

When operating a jack device 28, before a return stroke of the yoke assembly 270 can be made, there must be no weight carried by the yoke assembly. The weight of the column 24 or the support 12, which ever is being moved, first must be transferred to the locking assembly 446 so that the lift-heads 284 may be disengaged from the lugs 250. This is accomplished by operating the locking assembly 446 for a short period to raise the column 24 or the platform 12 to relieve all of the weight from the yoke assembly.

Instead of providing each yoke assembly 270 with four lift-head assemblies 284, three such lift-head assemblies, spaced apart equal distances around each yoke assembly, may be used. Each column member, instead of being of the single hollow-cylinder type, may be built up of spaced-apart tubular members, such as the column members illustrated and described in my copending application Serial No. 681,057 now Patent No. 3,082,607.

One of the principal advantages of the apparatus for supporting equipment at off-shore locations described herein is its adaptability for use in exploratory well drilling operations. As compared with previous types of off-shore equipment supports, it is easily moved from one drilling site to another. This is made possible, in part, by the special jack system which allows the floatable platform to be readily erected or lowered.

Another advantage is the provision of a stand which can be carried by the floatable platform and lowered or raised by the jack system. In the event a producing well is established, the stand may be detached from the platform and left in place to serve as a production stand thus eliminating the time and expense involved in previous practices wherein a separate production stand must be erected.

This invention contemplates the relative frequent raising and lowering of the floatable platform and the stand. The jack system described herein may carry out such frequent operations without the drawbacks encountered in previous types of jack systems, such as hydraulic jack systems, for example. The jack system is safe. The apparatus cannot collapse if there is a power failure during any part of jacking operation. This is due to the positive engagement of the members, a feature which is inherent in this type of mechanical apparatus. The jack system is relatively inexpensive to install and maintain compared with hydraulic type jack equipment. Also, the operation of the jack system is not complex. This makes it particularly suitable for use in off-shore apparatus when frequent raising and lowering operations are contemplated.

Although certain embodiments of this invention have been described in detail, it will be apparent to persons skilled in the art that modifications may be made. Consequently, it is intended that the foregoing description should be considered as exemplary only, and that the scope of the invention should be determined from the following claims.

I claim:

1. Apparatus for supporting equipment above the surface of a body of water comprising a platform adapted to be towed to an offshore location, at least one vertically extending column mounted in an opening which extends through the platform, jack means for effecting relative vertical movement between the platform and the column, said jack means comprising yoke means surrounding the column and movable vertically, at least one lift-head pivotally connected to the yoke means and movable with respect to the yoke means towards and away from the column for selectively connecting or disconnecting the yoke means and the column at any one of a number of positions along the column, vertically extending shaft means, ball bearing means threadedly connecting the shaft means and the lift-head so that rotation of the shaft means causes relative movement between the shaft means and the yoke means, bearing means for connecting the shaft means to the platform against vertical movement with respect to the platform, joint means in the shaft for allowing the shaft to pivot towards and away from the column, and power means for rotating the shaft means.

2. Apparatus for supporting equipment above the surface of a body of water comprising a platform adapted to be towed to an offshore location, at least one vertically extending column mounted in an opening which extends through the platform, jack means for effecting relative vertical movement between the platform and the column, said jack means comprising yoke means surrounding the column and movable vertically, at least one lift-head connected to the yoke means and movable with respect to the yoke means for selectively connecting or disconnecting the yoke means and the column at any one of a number of positions along the column, shaft means threadedly connected to the lift-head so that rotation of the shaft means causes relative movement between the shaft means and yoke means, said shaft means being connected to the platform against vertical movement with respect thereto, power means for rotating the shaft means, releasable lock means for preventing relative movement between the column and the platform, means for operating the lock means, and means for adjusting the vertical position of the lock means.

3. Apparatus for supporting equipment above the surface of a body of water comprising a platform adapted to be towed to an offshore location, at least one vertically extending column mounted in an opening which extends through the platform, jack means for effecting relative vertical movement between the platform and the column, said jack means comprising yoke means surrounding the column and movable vertically, at least one lift-head connected to the yoke means and movable with respect to the yoke means for selectively connecting or disconnecting the yoke means and the column at any one of a number of positions along the column, shaft means threadedly connected to the lift-head so that rotation of the shaft means causes relative movement between the shaft means and yoke means, said shaft means being connected to the platform against vertical movement with respect thereto, power means for rotating the shaft means, releasable lock means for preventing relative movement between the column and the platform, means for operating the lock means, second shaft means threadedly connected to the lock means so that rotation of the second shaft causes vertical adjustment of the lock means, and second power means for rotating the second shaft means.

4. Jacking apparatus for effecting relative vertical movement between a platform and a substantially vertically extending elongated column adapted to support or to be supported by the platform, comprising column engaging means movable in either vertical direction and selectively movable with respect to the column and the platform; a plurality of assemblies spaced circumferentially of the column for effecting said movement of the column engaging means, each assembly comprising an elongated shaft member extending generally vertically and a nut member receiving the shaft member, one of said members being rotatable with respect to the other whereupon rotation of said rotatable member causes relative movement therebetween along the longitudinal axis of the shaft member; one of the members of said assembly being connected with the column engaging means, the other of the members of said assembly being connected with the platform; connecting means engaged with each assembly and movably mounted on the column engaging means for connecting the column engaging means with the column to prevent relative vertical movement therebetween; and power means for rotating the rotatable member in either rotational direction to effect upward or downward movement of the column engaging means and relative vertical movement between the column and the platform when the connecting means connects the column engaging means with the column releasable lock means for preventing relative movement between the column and the platform, means for operating said lock means, and means for adjusting the vertical position of said lock means.

5. Jacking apparatus as defined in claim 4 wherein said power means is mounted on the platform and includes gear means for rotating said rotatable member.

References Cited by the Examiner

UNITED STATES PATENTS

| 2,841,961 | 7/1958 | Lucas | 254—106 X |
| 2,992,812 | 7/1961 | Rasmussen et al. | 254—107 |

WILLIAM FELDMAN, *Primary Examiner.*

OTHELL M. SIMPSON, *Examiner.*